United States Patent [19]

Aurness et al.

[11] Patent Number: 5,088,232
[45] Date of Patent: Feb. 18, 1992

[54] WATER AND FERTILIZER APPLICATOR FOR LAWN AND SHRUBS

[76] Inventors: Harold O. Aurness, 5808 Knox Ave. N., Brooklyn Center, Minn. 55430; Daniel R. Saufferer, 8126 Colfax Ave. S., Bloomington, Minn. 55420

[21] Appl. No.: 529,592

[22] Filed: May 29, 1990

[51] Int. Cl.$^5$ .............................................. A01C 00/00
[52] U.S. Cl. ........................................ 47/1.5; 239/754; 239/159
[58] Field of Search ..................... 47/1.5; 239/754, 159

[56] References Cited

U.S. PATENT DOCUMENTS

| | | | |
|---|---|---|---|
| 2,595,933 | 5/1952 | Gilbertsen | 239/754 |
| 2,784,030 | 3/1957 | Dietzel | 239/754 |
| 3,064,904 | 11/1962 | Roberts | 239/754 |
| 3,202,362 | 8/1965 | Wright | 239/754 |
| 4,009,666 | 3/1977 | Russell | 239/754 |

Primary Examiner—Henry E. Raduazo

[57] ABSTRACT

A water applicator unit according to the teachings of the present invention is shown as including a cylindrical mixing tank fixed to a parallel pair of support tubes which extend above the top as handles and below the tank as legs leading to a pair of wheels. A water pipe attachable to a garden hose at the top, extends under the mixing tank to a spreader tube between the wheels at the bottom. A spreader plate held on the support tube and the spreader tube bends a lower end in spaced relation down over the spreader tube to part the grass as the water drops through holes in the spreader tube directly to the roots of the grass. Carried on cleats on the top of the spreader plate is a short hose and sprayer used to water shrubs and leads from the water pipe through a shut-off valve. The mixing tank also connects to the water pipe from a T-joint through a control valve in the lower end and is used when a fertilizer application is needed. The mixture in the mixing tank flows one way out of a ball valve at the middle of the tank back into the water pipe with a portion flowing back into the mixing tank at the lower control valve. A second set of wheels, adjustable and retractable, support the unit in an incline position.

4 Claims, 1 Drawing Sheet

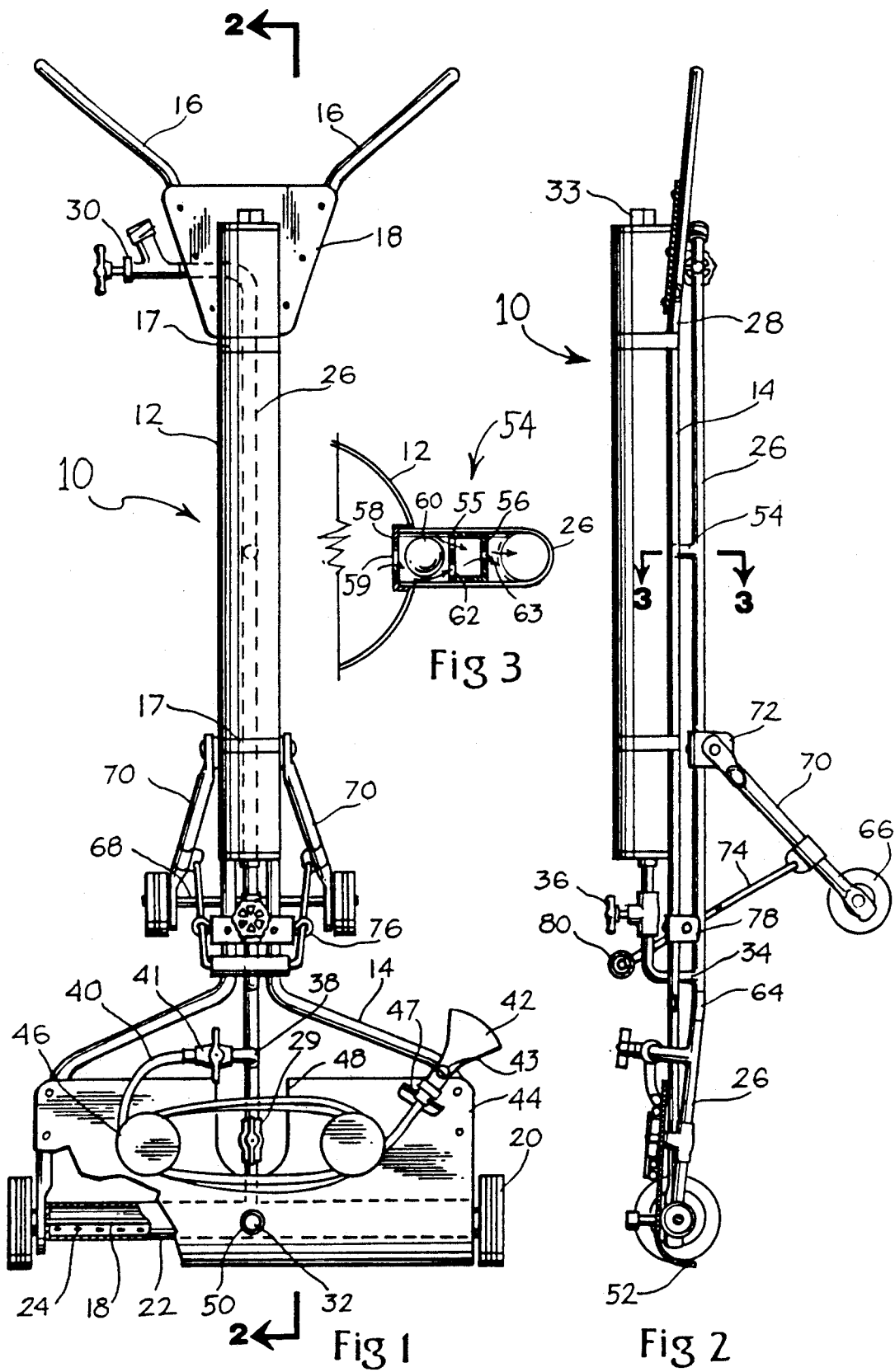

WATER AND FERTILIZER APPLICATOR FOR LAWN AND SHRUBS

The present invention relates generally to lawn watering and fertilizing means.

With the population of the world growing and weather conditions changing, there are important reasons to conserve water. This invention provides part of the solution to this problem.

SUMMARY

The present invention provides a means to conserve water by applying the water, with or without fertilizer, directly to the roots of the grass to minimize the waste from evaporation common to other application methods. Specifically, a water pipe on tubular supports which have wheels on one end and handles on the other, is attached to a garden hose and wheeled along the course to be watered or fertilized.

The water comes in at the top end of the water pipe, through a control valve, and flows to a spreader tube between the two wheels at the bottom and out spaced holes along the bottom of the spreader tube. An axle of the wheels through the spreader tube helps distribute the water or mixture evenly through the spreader tube.

Helping to direct the water to the roots of the grass is a rectangular spreader plate removably attached to the tube supports above the spreader tube. The spreader plate has a bottom side which curves down over the spreader tube in spaced relation and bends the grass down ahead of the water or mixture coming out of the spreader tube as the unit is pushed along. Access openings are provided in the spreader plate for the water pipe shut-off valve and a capped cleanout tube in the spreader tube. The plate also features two circular cleats around which a small hose is wound, when not in use, for watering shrubs. It extends from a shut-off valve on a T-joint extending from the water pipe and has a sprayer head.

For fertilizing use the unit features a mixing tank of cylindrical shape fastened vertically to the support tubes. A T-joint on the water pipe diverts some of the water into the bottom end of the mixing tank through a control valve. The mixture then flows one way out a ball valve at the middle of the tank, rationed through a small opening back into the water pipe. Most of the mixture then flows to the spreader tube with some being rediverted back into the mixing tank at the T-joint.

To hold the unit in an inclined position there is a second set of wheels fastened to pivotable wheel legs extending from the support tubes with leg braces from the wheel legs extending up slideably through holding and tightening means on the support tubes. The braces become a handle with which to change the incline.

ILLUSTRATIONS

FIG. 1 shows a top, frontal view of the water applicator.

FIG. 2 shows a cross-sectional view of FIG. 1 according to section line 2—2 of FIG. 1.

FIG. 3 shows a cross-sectional view of the ball valve according to section line 3—3 of FIG. 2.

DESCRIPTION

A water applicator is wholly shown in the drawings and generally designated 10. Unit 10 comprises a long, tubular mixing tank 12 mounted parallel to two parallel spaced support tubes 14 which extend up beyond the said tank 12 to diverge as handles 16. A support plate 18 extends between the said tubes 14 under the end of the mixing tank 12. Bands 17 hold the support tubes 14 to the mixing tank 12 at upper and lower end points. The support tubes 14 also extend downward beyond the lower end of the mixing tank 12 to diverge and become parallel again in the same plane and continue on to connect to an axle 18 extending between the support tubes 14 and on which wheels 20 are fixed. The said axle 18 passes through a spreader tube 22 which also extends between the said wheels 20. The said spreader tube 22, which has sealed ends, has spaced holes 24 extending in a line along the bottom parallel with the axle 18.

A rigid water pipe 26 extends the length of the unit from near the base 28 of the said handles 16 to the lateral center of the spreader tube 22. A shut-off valve 29 is inserted in the water pipe 26 just before it joins the spreader tube 22. A threaded Y and control valve 30 at the top of the water pipe 26 connects to a garden hose. A capped clean-out hole tube 32 extends up from the top center of the spreader tube 22.

A threaded plug 33 at the top end of the mixing tank 12 allows access to the tank to put in fertilizer.

At a point on the water pipe 26 below the end of the mixing tank 12 is a first T-joint 34 connection leading to a control valve 36 which leads into the end of the mixing tank 12 which diverts water into the tank when the unit is used to apply fertilizer.

At another point in the water pipe 26 between the said first T connection joint 34 and the said shut-off valve 29 is a second T-joint connection 38 leading to a short sprayer hose 40. The said sprayer hose 40 for supplemental spraying of shrubs is attached by a threaded connection to a shut-off valve 41. The sprayer hose 40 is of a small diameter with a screw-on sprayer head 4 with a shut-off valve 43. It is held at rest on the top of a rectangular, removable sprayer plate 44 attached over the top of the spreader tube 22 to the support tubes 14 at the bottom of unit 10. The sprayer hose 40 is wound around and under circular cleats 46 spaced symetrically on the top of the said sprayer plate 44 and secured by a clinch holder 47 on the top of the sprayer plate 44 at the said sprayer head 42.

A wide opening 48 from the center top of the sprayer plate 44 to the middle gives access to the shrube hose shut-off valve 43. A lower opening 50 in line with the said opening 48 provides space for the said clean-out hole tube 32. The bottom end side 52 of the sprayer plate 44 curves down in spaced relation over the spreader tube 22 and bends the grass down evenly as unit 10 is hand-pushed along. The water then flows directly to the roots of the grass.

At a midpoint between the top and bottom of the mixing tank 12 is a ball valve 54 joining the water pipe 26 and the mixing tank 12 which allows a mixture of fertilizer and water to flow one way from the mixing tank 12 to the water pipe 26. The said ball valve 54 comprises two spaced dividers 55 and 56 in the middle section which valve has an end cap 58 with a small hole 59 extending into the mixing tank 12. Below the said cap 58 is a float ball 60 small enough to allow liquid to flow around it into several small holes 62 spaced around the edge of the said divider 55. The said second divider 56 has a single larger hole 63 leading into the water pipe 26 which then carries the mixture down to the first T-joint connection 34. Part of the mixture is diverted by the force of the flow into the connection 34, through the control valve 36 into the bottom of the mixing tank 12. The rest of the mixture in the water pipe 26 continues on to the spreader tube 22 through the said shut-off valve 29 to be dispensed out the holes 24. The axle 18 helps to disperse the mixture evenly across the interior of the spreader tube 22. This recycling action tends to keep an even mixture flowing through the system. A straight transparent connecting tube 64 is inserted in the water pipe 26 above the shut-off valve 29 for color checking the fertilizer mix.

A second paid of wheels 66 connected by an axle 68 is attached to rotatable legs 70 secured to a crossbar bracket 72 at a midpoint of the support tubes 14. Leg braces 74 attached rotatably to near the lower end of the legs 70 extend up in a converging manner beyond the lower part of the unit passing through the loop ends 76 of a turn-buckle secured in a U-shaped bracket 78 on the support tubes 14. The top ends of the leg braces 74 bend toward each other with a gap between and are covered by a tubular handle 80 which allows the wheels 66 to be locked in place, adjusted as desired.

We claim:

1. A lawn applicator unit adapted to roll across a lawn in a direction of travel and to dispense a mixture of fertilizer and water, said unit comprising:
   A) a rigid frame having upper and lower ends and a mid portion extending between said ends;
   a handle means at the upper end of the frame;
   a first set of wheels mounted on an axil supported transversely at the lower end of said rigid frame; and
   a second set of wheels provided on adjustable support legs and secured to the mid portion of said rigid frame, and
   said applicator unit further including:
   B) a flow distribution system adapted to evenly spread fertilizer mixture on a lawn said distribution system comprising;
   a main water conduit extending along said frame having an upper, lower and mid portions;
   a tubular tank secured on said frame having an upper, lower and mid portions and means causing fertilizer mixture stored in said tank to flow at a predetermined rate into said main water conduit;
   a distributor means extending along said axil and connected to said lower portion of said main frame; and
   a parting means provided ahead of said axil in the direction of travel of said applicator unit to part the grass and permit the fertilizer mixture to go directly to the ground.

2. A lawn applicator unit of claim 1 wherein said means causing said fertilizer mixture to flow into said main water conduit comprises:
   a ball valve connected between said mid portion of said main conduit and said mid portion of said tank and a second control valve connected between said lower portion of said main conduit and the lower portion of said tank.

3. A lawn applicator unit of claim 2 wherein said ball valve comprises:
   a cylinder having two ends with a cap having a small central opening provided at one end of said cylinder connected to said tank and said other end of said cylinder provided with a connection to said main water conduit;
   a divider in said cylinder having a series of small holes, and
   a ball provided between said divider and said cap and adapted to block the hole in said cap when fluid pressure presses said ball against said small central opening whereby mixture in said tank may flow in only one direction.

4. A lawn applicator unit of claim 1 and further including a connection means including a cutoff valve provided on said applicator unit and adapted to receive a flexible shrub sprayer attachment.

* * * * *